(12) United States Patent
Bai et al.

(10) Patent No.: US 11,438,047 B2
(45) Date of Patent: Sep. 6, 2022

(54) BEAM FAILURE INDICATION TECHNIQUES

(71) Applicant: QUALCOMM Incorporated, San Diego, CA (US)

(72) Inventors: Tianyang Bai, Bridgewater, NJ (US); Jung Ho Ryu, Fort Lee, NJ (US); Kiran Venugopal, Raritan, NJ (US); Yan Zhou, San Diego, CA (US); Xiao Feng Wang, San Diego, CA (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 16/747,309

(22) Filed: Jan. 20, 2020

(65) Prior Publication Data

US 2020/0266872 A1 Aug. 20, 2020

Related U.S. Application Data

(60) Provisional application No. 62/805,732, filed on Feb. 14, 2019.

(51) Int. Cl.
| | |
|---|---|
| *H04W 4/00* | (2018.01) |
| *H04B 7/06* | (2006.01) |
| *H04L 5/00* | (2006.01) |
| *H04W 24/10* | (2009.01) |
| *H04W 72/04* | (2009.01) |

(52) U.S. Cl.
CPC ......... *H04B 7/0695* (2013.01); *H04B 7/0617* (2013.01); *H04L 5/001* (2013.01); *H04L 5/0051* (2013.01); *H04W 24/10* (2013.01); *H04W 72/0446* (2013.01); *H04W 72/0453* (2013.01)

(58) Field of Classification Search
CPC ..... H04B 7/0695; H04B 7/0617; H04L 5/001; H04L 5/0051; H04W 24/10; H04W 72/0446; H04W 72/0453
USPC .................................. 370/329–330, 335–345
See application file for complete search history.

(56) References Cited

U.S. PATENT DOCUMENTS

| | | | |
|---|---|---|---|
| 2019/0037604 A1 | 1/2019 | Akkarakaran et al. | |
| 2019/0289588 A1* | 9/2019 | Akkarakaran | H04W 72/046 |
| 2021/0058998 A1* | 2/2021 | Yuan | H04W 72/0413 |

FOREIGN PATENT DOCUMENTS

WO 2018136300 A1 7/2018

OTHER PUBLICATIONS

International Search Report and Written Opinion—PCT/US2020/014436—ISAEPO—dated May 13, 2020.

* cited by examiner

*Primary Examiner* — Thai D Hoang
(74) *Attorney, Agent, or Firm* — Harrity & Harrity, LLP

(57) ABSTRACT

Various aspects of the present disclosure generally relate to wireless communication. In some aspects, a user equipment (UE) may detect a beam failure associated with a component carrier (CC) of a plurality of CCs that are aggregated. The UE may identify, based at least in part on detecting the beam failure, a CC group in which the CC and one or more other CCs, of the plurality of CCs, are included. The UE may transmit, to the BS, a beam failure recovery request (BFRQ) communication associated with the CC group. Numerous other aspects are provided.

53 Claims, 8 Drawing Sheets

BEAM FAILURE INDICATION TECHNIQUES

CROSS-REFERENCE TO RELATED APPLICATION

This application claims priority to U.S. Provisional Application No. 62/805,732, filed on Feb. 14, 2019, entitled "INDICATING A BEAM FAILURE," which is hereby expressly incorporated by reference herein as if fully set forth below in its entirety and for all applicable purposes.

TECHNICAL FIELD

Aspects of the technology described below generally relate to wireless communication and to techniques and apparatuses for indicating a beam failure. Some techniques and apparatuses described herein enable and provide wireless communication devices and systems configured for carrier aggregation and low-overhead beam failure reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a user equipment (UE), may include detecting a beam failure associated with a component carrier (CC) of a plurality of CCs that are aggregated for the UE by a base station (BS); identifying, based at least in part on detecting the beam failure, a CC group in which the CC and one or more other CCs, of the plurality of CCs, are included; and transmitting, to the BS, a beam failure recovery request (BFRQ) communication associated with the CC group.

In some aspects, a UE for wireless communication may include memory and one or more processors operatively coupled to the memory. The memory and the one or more processors may be configured to detect a beam failure associated with a CC of a plurality of CCs that are aggregated for the UE by a BS; identify, based at least in part on detecting the beam failure, a CC group in which the CC and one or more other CCs, of the plurality of CCs, are included; and transmit, to the BS, a BFRQ communication associated with the CC group.

In some aspects, a non-transitory computer-readable medium may store one or more instructions for wireless communication. The one or more instructions, when executed by one or more processors of a UE, may cause the one or more processors to detect a beam failure associated with a CC of a plurality of CCs that are aggregated for the UE by a BS; identify, based at least in part on detecting the beam failure, a CC group in which the CC and one or more other CCs, of the plurality of CCs, are included; and transmit, to the BS, a BFRQ communication associated with the CC group.

In some aspects, an apparatus for wireless communication may include means for detecting a beam failure associated with a CC of a plurality of CCs that are aggregated for the apparatus by a BS; means for identifying, based at least in part on detecting the beam failure, a CC group in which the CC and one or more other CCs, of the plurality of CCs, are included; and means for transmitting, to the BS, a BFRQ communication associated with the CC group.

In some aspects, a method of wireless communication, performed by a BS, may include transmitting, to a UE, a beam failure detection reference signal (BFD-RS) associated with a CC of a plurality of CCs aggregated for the UE by the BS; and receiving, from the UE and based at least in part on transmitting the BFD-RS, a BFRQ communication associated with a CC group in which the CC and one or more other CCs, of the plurality of CCs, are included.

In some aspects, a BS for wireless communication may include memory and one or more processors operatively coupled to the memory. The memory and the one or more processors may be configured to transmit, to a UE, a BFD-RS associated with a CC of a plurality of CCs aggregated for the UE by the BS; and receive, from the UE and based at least in part on transmitting the BFD-RS, a BFRQ communication associated with a CC group in which the CC and one or more other CCs, of the plurality of CCs, are included.

In some aspects, a non-transitory computer-readable medium may store one or more instructions for wireless communication. The one or more instructions, when executed by one or more processors of a BS, may cause the one or more processors to: transmit, to a UE, a BFD-RS associated with a CC of a plurality of CCs aggregated for the UE by the BS; and receive, from the UE and based at least in part on transmitting the BFD-RS, a BFRQ communication associated with a CC group in which the CC and one or more other CCs, of the plurality of CCs, are included.

In some aspects, an apparatus for wireless communication may include means for transmitting, to a UE, a BFD-RS associated with a CC of a plurality of CCs aggregated for the UE by the apparatus; and means for receiving, from the UE and based at least in part on transmitting the BFD-RS, a BFRQ communication associated with a CC group in which the CC and one or more other CCs, of the plurality of CCs, are included.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
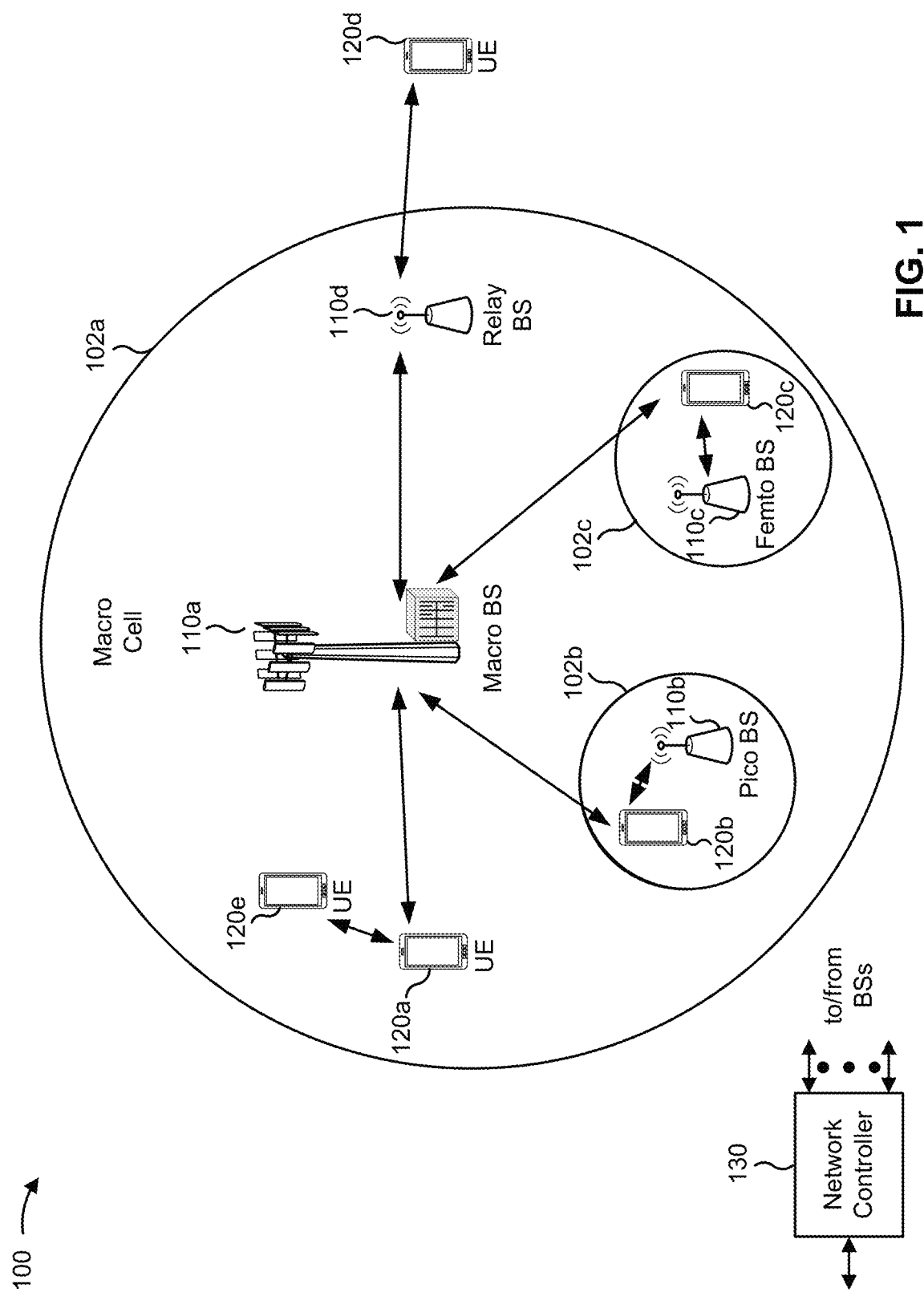
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like.

A BS 110 may communicate with a UE 120 via a wireless access link, which may include an uplink and a downlink. The UE 120 may transmit uplink communications to the BS 110 on the uplink, and may receive downlink communications from the BS 110 on the downlink. In some cases, a BS 110 may aggregate a plurality of radio frequency carriers for a downlink channel of the downlink. The aggregation of frequency carriers may be referred to as carrier aggregation. Carrier aggregation may increase the bandwidth of the downlink channel, which in turn may increase throughput on the downlink channel, increase reliability of the downlink channel, decrease latency on the downlink channel, and/or the like. Each radio frequency carrier in a carrier-aggregated downlink channel may be referred to as a component carrier (CC). The CCs included in the carrier-aggregated downlink channel may include contiguous CCs in the same frequency band, may include non-contiguous CCs in the same frequency band, may include non-contiguous CCs in different frequency bands, and/or the like.

Each BS may provide communication coverage for a particular geographic area. In 3GPP, the term "cell" can refer to a coverage area of a BS and/or a BS subsystem serving this coverage area, depending on the context in which the term is used. A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network in some deployments. The network can include BSs of different types and having various coverage areas, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
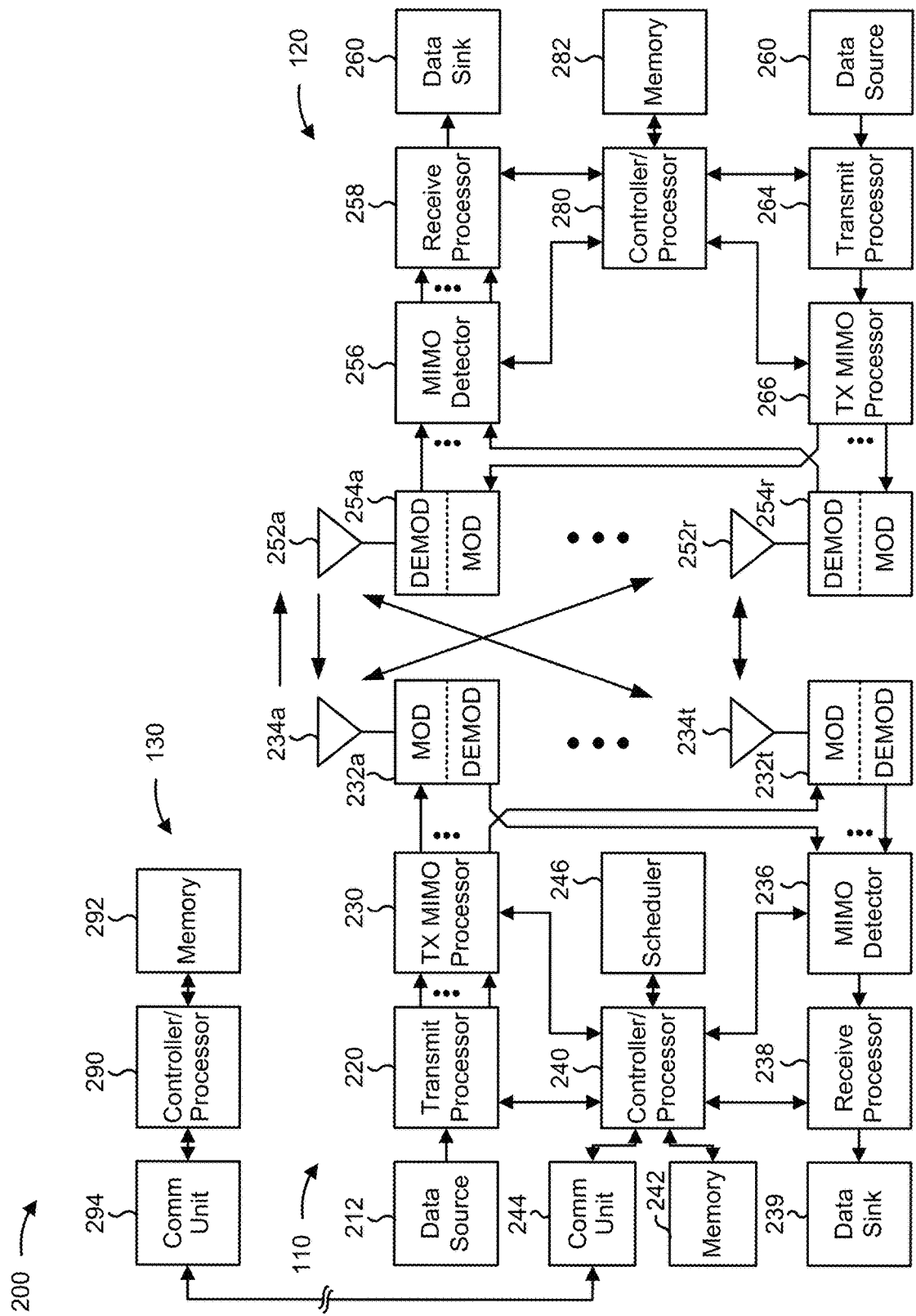
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating a beam failure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for means for detecting a beam failure associated with a CC of a plurality of CCs that are aggregated (e.g., for the UE 120 by a BS 110), means for identifying, based at least in part on detecting the beam failure, a CC group in which the CC and one or more other CCs, of the plurality of CCs, are included, means for transmitting, to the BS, a BFRQ communication associated with the CC group, and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, base station 110 may include means for transmitting, to a UE 120, a BFD-RS associated with a CC of a plurality of CCs that are aggregated (e.g., for the UE 120 by the BS 110, means for receiving, from the UE 120 and based at least in part on transmitting the BFD-RS, a BFRQ communication associated with a CC group in which the CC and one or more other CCs, of the plurality of CCs, are included, and/or the like. In some aspects, such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3A:
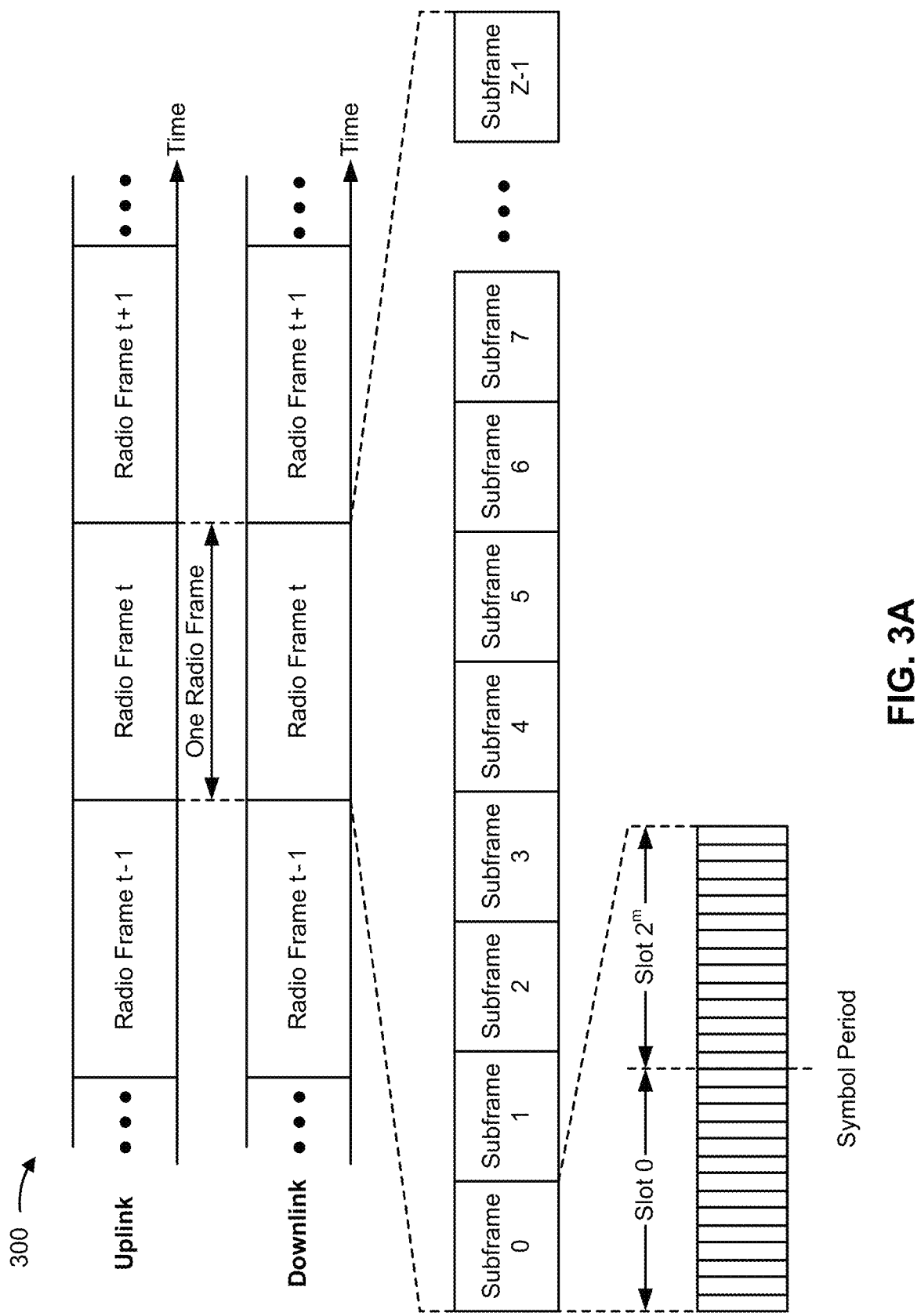
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
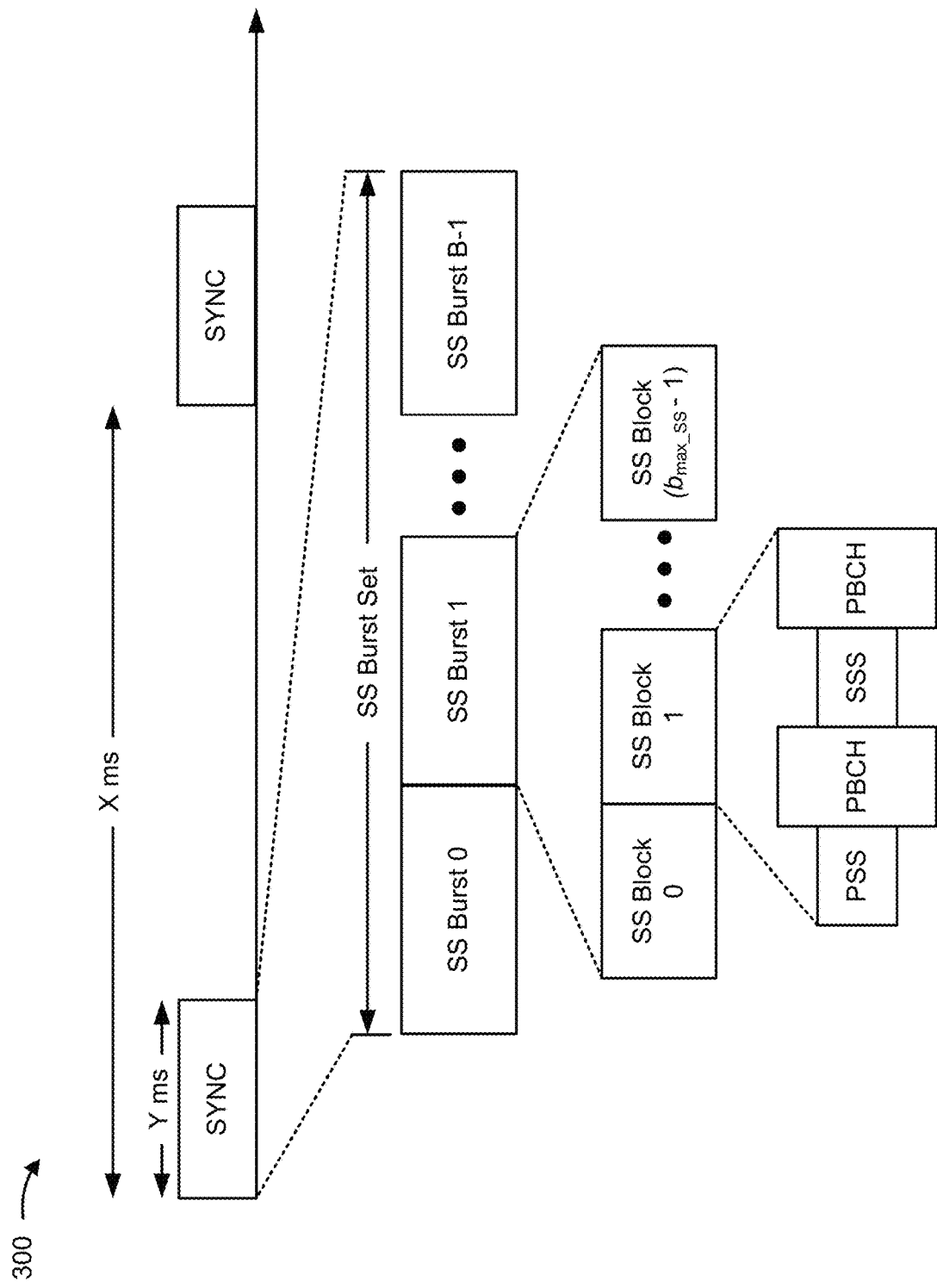
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
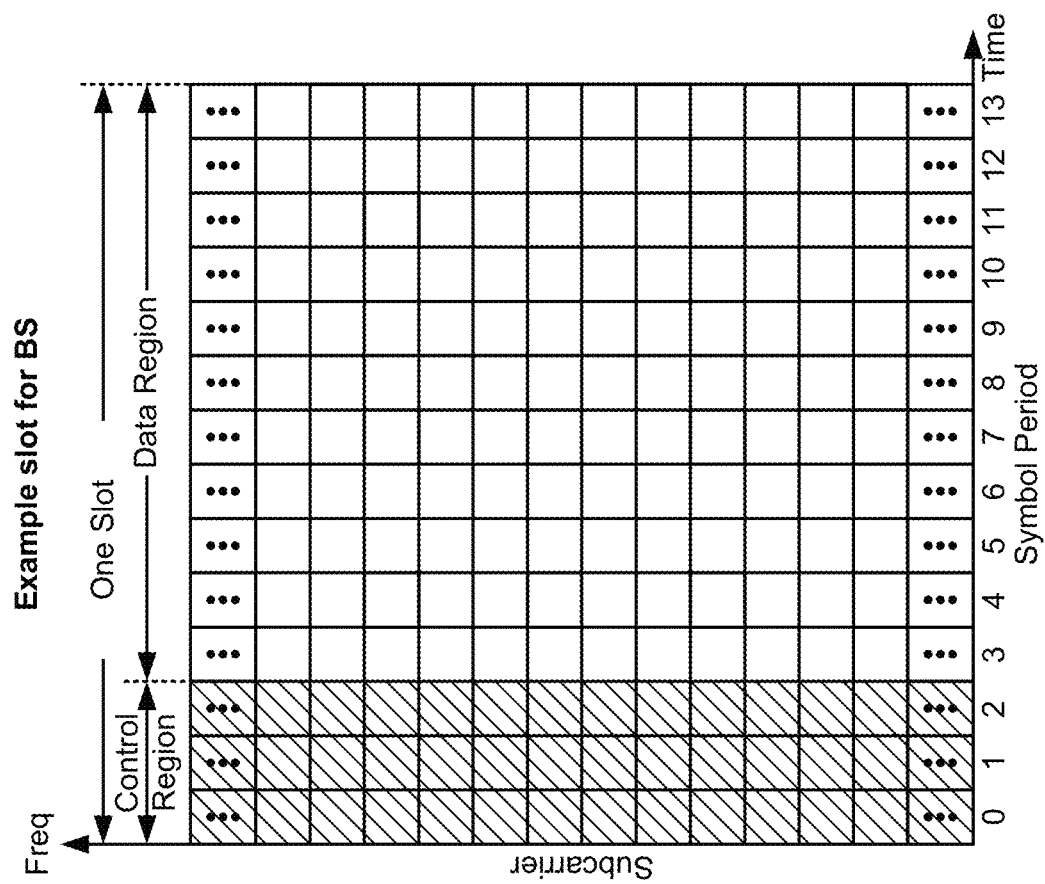
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers or CCs with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

A beam may be configured to include one or more sub-carriers or CCs. In some cases, each of the sub-carriers or CCs of one or more resource blocks included in the slot format 410 may be configured or assigned to different beams such that transmission and/or reception on each sub-carrier or CC may be performed on a respective beam. In some cases, at least a subset (or all) of the sub-carriers or CCs of one or more resource blocks included in the slot format 410 may be aggregated and assigned to the same beam such that the beam may be used for transmission and/or reception in the aggregated sub-carriers or CCs.

As indicated above, FIG. 4 is provided as an example. Other examples may differ from what is described with regard to FIG. 4.

In a wireless network, a BS and a UE may communicate via various transmissions. These transmission can occur over uplink and downlink channels. In some cases, the BS may aggregate a plurality of radio frequency carriers (component carriers) for the downlink channel as part of a carrier aggregation configuration. In some cases, each component carrier may be associated with a respective beam transmitted from the BS.

To provide failure detection of the beams, the BS may transmit a respective beam failure detection reference signal (BFD-RS) associated with each of the beams, may transmit a BFD-RS associated with a subset of the beams, and/or the like. The UE may perform one or more measurements of a BFD-RS and may determine whether a corresponding beam has failed based at least in part on the one or more measurements. If the UE detects a beam failure, the UE may transmit a beam failure request (BFRQ) communication to the BS, and may indicate, to the BS, the CC index associated with the CC corresponding to the failed beam. Since carrier aggregation results in a greater quantity of CCs being aggregated for the UE, the signaling overhead to report individual beam failures for a plurality of CCs may be inefficient and may result in the consumption of significant radio resources.

Some aspects, described herein, provide techniques and apparatuses for indicating a beam failure. In some aspects, a UE may be configured to transmit an indication of a beam failure associated with a plurality of CCs. The CCs can be grouped into a CC group or some other composite bunch. The CC group can be used for a variety of beam failure related communications. In some aspects, using a CC group for such communications can yield low overhead scenarios. According to some deployments, using a CC group can result in fewer BFRQ and/or other signaling communications to report the beam failure relative to reporting beam failures associated with individual CCs. In this manner, beam failure detection, beam information updates, and beam re-establishment requests can be addressed at a group level in addition to or alternatively from an individual CC and/or beam basis.

According to some aspects, UE may detect a beam failure associated with a CC of a plurality of CCs. This plurality of CCs can be aggregated for the UE. Aggregation can occur based on BS control and/or dynamically based on BS-UE communications. A UE may identify, based at least in part on detecting a beam failure, a CC group in which the CC and one or more other CCs, of the plurality of CCs, are included. A UE may transmit, to the BS, a BFRQ communication associated with the CC group. In this way, the UE transmits a single BFRQ communication for a plurality of CCs. These plurality of CCs may experience similar channel characteristics and/or are expected to experience beam failures together, as opposed to individual BFRQ communications for each CC of the plurality of CCs. Treating multiple CCs in this manner (e.g., as a group or composite bunch) can reduce signaling overhead (and thus, the consumption of radio resources) for reporting beam failures.

A set of CCs grouped together can exhibit correlated beam failures so managing at a group level may be desired in some scenarios. Then in case of a beam failure, the BFRQ from the UE would indicate the CC group id to the gNB and as a benefit all CCs in the CC group would benefit from the selection of a new beam, instead of conducting a BFRQ for each CC separately. As discussed below, CC group identification related notices may be made via explicit and/or implicit signaling. In some circumstances, group identification may not be needed. Additionally, according to some deployments, CC groups may be fixed or may be dynamic based on a variety of communication factors (e.g., channel conditions) and based on BS/UE control associated with aggregating and/or grouping CCs.

Figure 5:
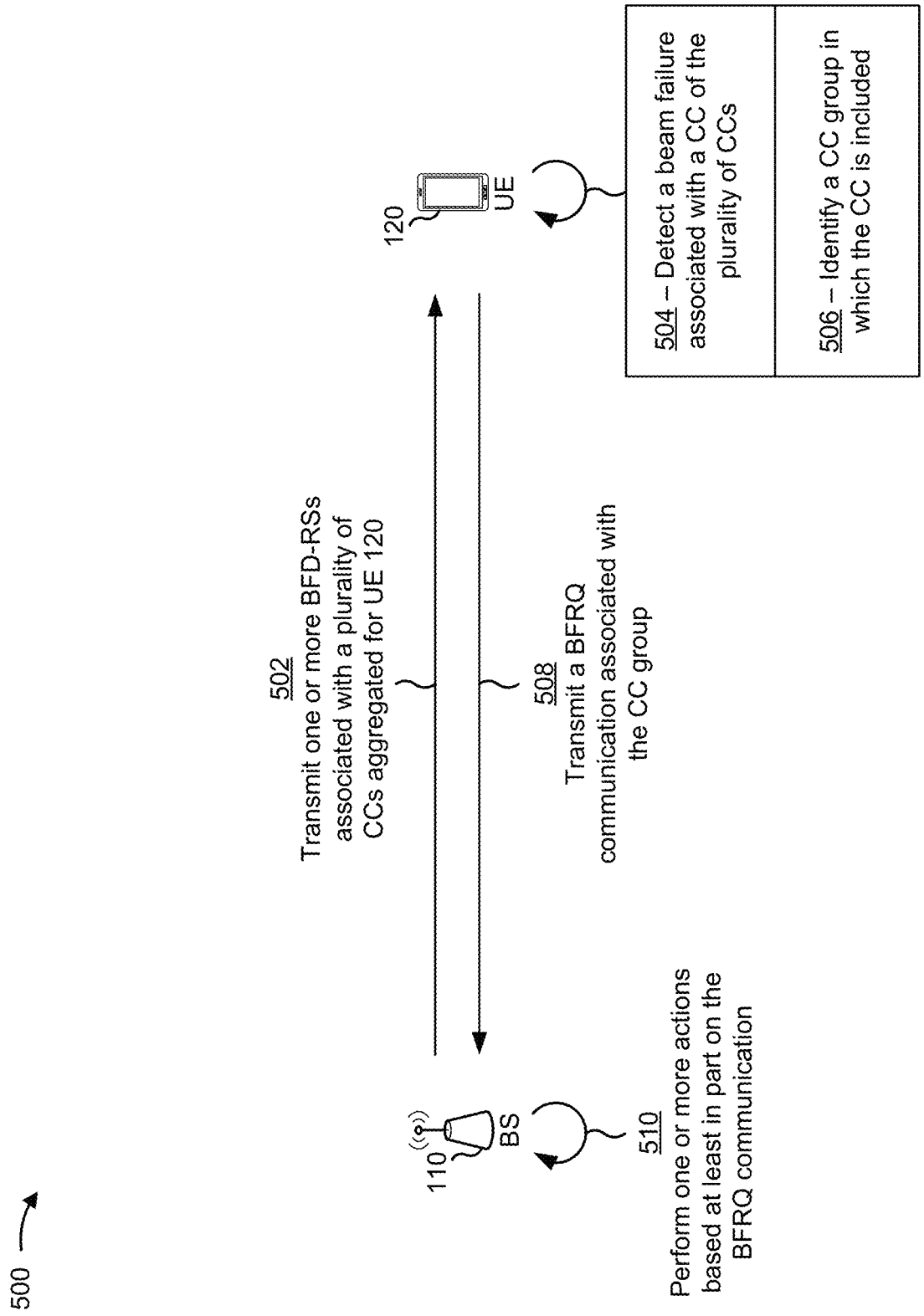
FIG. 5 is a diagram illustrating an example of indicating a beam failure, in accordance with various aspects of the present disclosure.

FIG. 5 is a diagram illustrating an example 500 of indicating a beam failure, in accordance with various aspects of the present disclosure. As shown in FIG. 5, example 500 may include a base station (e.g., BS 110) and a user equipment (e.g., UE 120). In some aspects, BS 110 and UE 120 may communicate via a downlink channel. In some aspects, BS 110 may aggregate a plurality of CCs into the downlink channel for UE 120.

As shown in FIG. 5, and by reference number 502, to facilitate the detection of failures of the beams associated with the plurality of CCs, BS 110 may transmit one or more BFD-RSs associated with the plurality of CCs. In some aspects, BS 110 may transmit a respective BFD-RS for each CC of the plurality of CCs. In some aspects, BS 110 may transmit a BFD-RS for two or more CCs of the plurality of CCs. A BFD-RS may include a reference signal that is transmitted via a beam in a particular time domain resource and/or a particular frequency domain resource to facilitate the detection of failures of the beam.

As further shown in FIG. 5, and by reference number 504, UE 120 may detect a beam failure associated with a CC of the plurality of CCs. In some aspects, UE 120 may detect the beam failure based at least in part on a BFD-RS transmitted via the beam associated with the CC, based at least in part on a BFD-RS, transmitted via another beam associated with another CC, that is shared by the CC and the other CC, and/or the like.

In some aspects, UE 120 may detect the beam failure, associated with the CC, based at least in part on performing one or more measurements associated with the BFD-RS. Examples of measurements may include a reference signal received power (RSRP) measurement, a reference signal received quality (RSRQ) measurement, a received signal strength indication (RSSI) measurement, a signal-to-noise (SNR) measurement, a signal-to-interference-plus-noise (SINR) measurement, and/or other types of signal measurements. In some aspects, UE 120 may determine that the beam associated with the CC has failed based at least in part on determining that one or more of the measurements do not satisfy a threshold (e.g., based at least in part on determining that the RSRP measurement does not satisfy an RSRP threshold, based at least in part on determining that the RSRQ measurement does not satisfy an RSRQ threshold, and/or the like).

As further shown in FIG. 5, and by reference number 506, UE 120 may identify a CC group in which a CC is included.

The CC group may include one or more other CCs of the plurality of CCs aggregated for UE 120. In some aspects, BS 110 (and/or another device included in the wireless network) may determine which CCs, of the plurality of CCs, are to be included in the CC group. For example, BS 110 may determine that the CC and the one or more other CCs may be grouped based at least in part on the CC and the one or more other CCs being expected to experience the same or similar channel characteristics (e.g., noise, fading, channel quality, and/or the like), based at least in part on the beams associated with the CC and the one or more other CCs being expected to fail at the same or similar times, and/or the like. In some aspects, CCs may be expected to experience the same or similar channel characteristics. And in some aspects, alternatively and/or additionally, CCs may be expected to fail at the same or similar times based at least in part on the CCs being quasi-co-located (QCLed) (e.g., cross-carrier QCLed). Other factors can also be considered when assembling or managing CC groups, including but not limited to being based at least in part on: CCs being included in the same frequency band and being adjacent and/or contiguous CCs; CCs being associated with the same BFD-RS; BFD-RS measurement results, associated with the CCs and provided by UE 120, being the same or similar measurement results, and/or the like.

In some aspects, BS 110 may transmit, to UE 120, an indication of the CCs that are included in the CC group. The indication may be included in a signaling communication, such as a radio resource control (RRC) communication, a medium access control control element (MAC-CE) communication, a downlink control information (DCI) communication, and/or the like. In some aspects, UE 120 may be configured (e.g., when deployed in the wireless network) with information identifying the CCs that are included in the CC group. UE 120 may identify the CC group, in which the CC is included, based at least in part on the indication of the CCs that are included in the CC group received from BS 110 (e.g., based at least in part on the indication indicating the CC is included in the CC group), may identify the CC group based at least in part on being configured with the information identifying the CCs that are included in the CC group (e.g., based at least in part on the information identifying the CCs indicating that the CC is included in the CC group), and/or the like.

In some aspects, the CCs, included in the CC group, may include all of the plurality of CCs aggregated for UE 120. In some cases, the CCs, included in the CC group, may include a subset of the plurality of CCs. In this case, BS 110 may configure a plurality of CC groups. In some cases, each CC group may include respective subsets of the plurality of CCs aggregated for UE 120. Each CC group, of the plurality of CC groups, may be associated with a respective CC group index. In some cases, a CC group index may be used to identify individual CC groups.

As further shown in FIG. 5, and by reference number 508, UE 120 may transmit, to BS 110, a BFRQ communication associated with the CC group. In some aspects, the BFRQ communication may indicate, to BS 110, that a beam failure of at least one beam associated with a CC included in the CC group has occurred. Additionally and/or alternatively, the BFRQ communication may function as a request for BS 110 to perform one or more beam failure recovery actions based at least in part on the beam failure.

In some aspects, if the CC group includes a subset of the plurality of CCs aggregated for UE 120 (and thus, there is a plurality of CC groups), UE 120 may transmit an indication of the CC group index associated with the CC group. In some aspects, the BFRQ communication may include the indication of the CC group index associated with the CC group (e.g., an explicit indication, an implicit indication, and/or the like). In some aspects, the BFRQ communication may function as a request for BS 110 to provide UE 120 with an uplink scheduling order (request, grant, and/or resource) for transmitting a reporting communication that includes the indication of the CC group index (e.g., an explicit indication, an implicit indication, and/or the like).

In some aspects, UE 120 may dynamically switch between explicitly and/or implicitly CC-related transmissions. As one example, the UE can transmit an indication of the CC group index based at least in part on a dynamic reporting rule configured at UE 120. The dynamic reporting rule may be received from BS 110 (e.g., BS 110 may transmit, to UE 120, information identifying the dynamic reporting rule), may be configured at UE 120 when UE 120 is deployed in the wireless network, and/or the like.

Dynamic reporting rules can be based on a number of factors. An example dynamic reporting rule may include an indication of a time domain resource and a frequency domain resource for transmitting the BFRQ communication. In this case, UE 120 may transmit, to BS 110, the BFRQ communication using the time domain resource and the frequency domain resource. The time domain resource and the frequency domain resource may be associated with, and configured for, the CC group, and therefore the use of the time domain resource and the frequency domain resource to transmit the BFRQ communication may be an implicit indication of the CC group index associated with the CC group.

In some deployments, a dynamic reporting rule may relate to or include a CC group index. An example dynamic reporting rule may include an indication to transmit an implicit indication of the CC group index if a quantity of CC groups, configured for the plurality of CCs aggregated for UE 120, does not satisfy a CC group quantity threshold (e.g., two CC groups, three CC groups, and/or the like), or transmit an explicit indication of the CC group index if the quantity of CC groups, configured for the plurality of CCs aggregated for UE 120, satisfies the CC group quantity threshold.

Implicit indication can be made in a variety of manners. In some aspects, an implicit indication of the CC group index associated with the CC group may include an explicit indication or implicit indication of a CC index associated with a CC included in the CC group. The explicit indication or implicit indication of the CC index may be included in the BFRQ communication and/or in the reporting communication that UE 120 transmits based at least in part on an uplink scheduling order that is provided to UE 120 as a result of transmitting the BFRQ communication to BS 110. In some aspects, an implicit indication of the CC group index may include transmitting the BFRQ communication and/or the reporting communication in a time domain resource and/or frequency domain resource associated with the CC group index. In some aspects, an implicit indication of the CC group index may include scrambling the BFRQ communication and/or the reporting communication using a scrambling sequence associated with the CC group index.

Explicit indications may be made in a variety of manners. In some aspects, an explicit indication of the CC group index may include a flag, a bit, a value, a field, and/or the like, that specifies the CC group index. The explicit indication may be included in the BFRQ communication and/or the reporting communication that UE 120 transmits based at least in part on an uplink scheduling order that is provided to UE 120 as a result of transmitting the BFRQ communication to BS 110.

CC groups can be structured or arranged in multiple manners. In some aspects, if the CC group includes all of the plurality of CCs aggregated for UE 120 (and thus, the CC group is the only CC group), UE 120 may refrain from indicating the CC group index associated with the CC group, which further reduces the signaling overhead of indicating beam failures associated with the plurality of CCs. In this case, since there is only one CC group, the BFRQ communication may function as an implicit indication of the CC group index associated with the CC group.

As further shown in FIG. 5, and by reference number 510, BS 110 may receive the BFRQ communication from UE 120. The BS 110 may perform one or more actions based at least in part on the BFRQ communication. In some aspects, the one or more actions may include transmitting, to UE 120, an uplink scheduling order that specifies a time domain resource and/or a frequency domain resource for UE 120 to transmit a reporting communication to BS 110. In this case, UE 120 may use the time domain resource and/or the frequency domain resource to transmit an implicit or explicit indication of the CC group index associated with the CC group.

In some aspects, the one or more actions may include determining that the BFRQ communication and/or the reporting communication indicates (explicitly or implicitly) the CC group index associated with the CC group. For example, BS 110 may identify an explicit indication of the CC group index included in the BFRQ communication and/or the reporting communication. As another example, BS 110 may identify an implicit indication of the CC group index based at least in part on an implicit or explicit indication of a CC index, associated with a CC included in the CC group, included in the BFRQ communication and/or the reporting communication. As another example, BS 110 may identify an implicit indication of the CC group index based at least in part on the BFRQ communication and/or the reporting communication being transmitted using a time domain resource and/or a frequency domain resource associated with the CC group index, based at least in part on the BFRQ communication and/or the reporting communication being scrambled using a scrambling sequence associated with the CC group index, and/or the like. As another example, BS 110 may determine that the CC group includes all of the plurality of CCs aggregated for UE 120, and accordingly may determine that the BFRQ communication and/or the reporting communication is an implicit indication of the CC group index.

In some aspects, the one or more actions may include performing beam failure recovery for a beam failure. Beam failure recovery may include reconfiguring one or more CCs, associated with the failed beam, to use another beam for communications. For example, beam failure operations can include communications transmitted from BS 110, to reestablish or reset a failed beam, and/or the like. In some aspects, reestablishing or resetting the failed beam may include performing a random access channel (RACH) procedure to establish a connection with UE 120 using the failed beam.

UEs may indicate beam failure in a variety of manners. In some deployments, UE 120 may be configured to transmit an indication of a beam failure associated with a plurality of CCs that are grouped into a CC group using fewer BFRQ and/or other signaling communications to report the beam failure relative to reporting beam failures associated with individual CCs. UE 120 may detect a beam failure associated with a CC of a plurality of CCs that are aggregated for UE 120 by BS 110. UE 120 may identify, based at least in part on detecting the beam failure, a CC group in which the CC and one or more other CCs, of the plurality of CCs, are included, and may transmit, to the BS 110, a BFRQ communication associated with the CC group. In this way, UE 120 transmits a single BFRQ communication for a plurality of CCs that experience similar channel characteristics and/or are expected to experience beam failures together, as opposed to individual BFRQ communications for each CC of the plurality of CCs, which reduces the signaling overhead (and thus, the consumption of radio resources) for reporting beam failures.

As indicated above, FIG. 5 is provided as an example. Other examples may differ from what is described with respect to FIG. 5.

Figure 6:
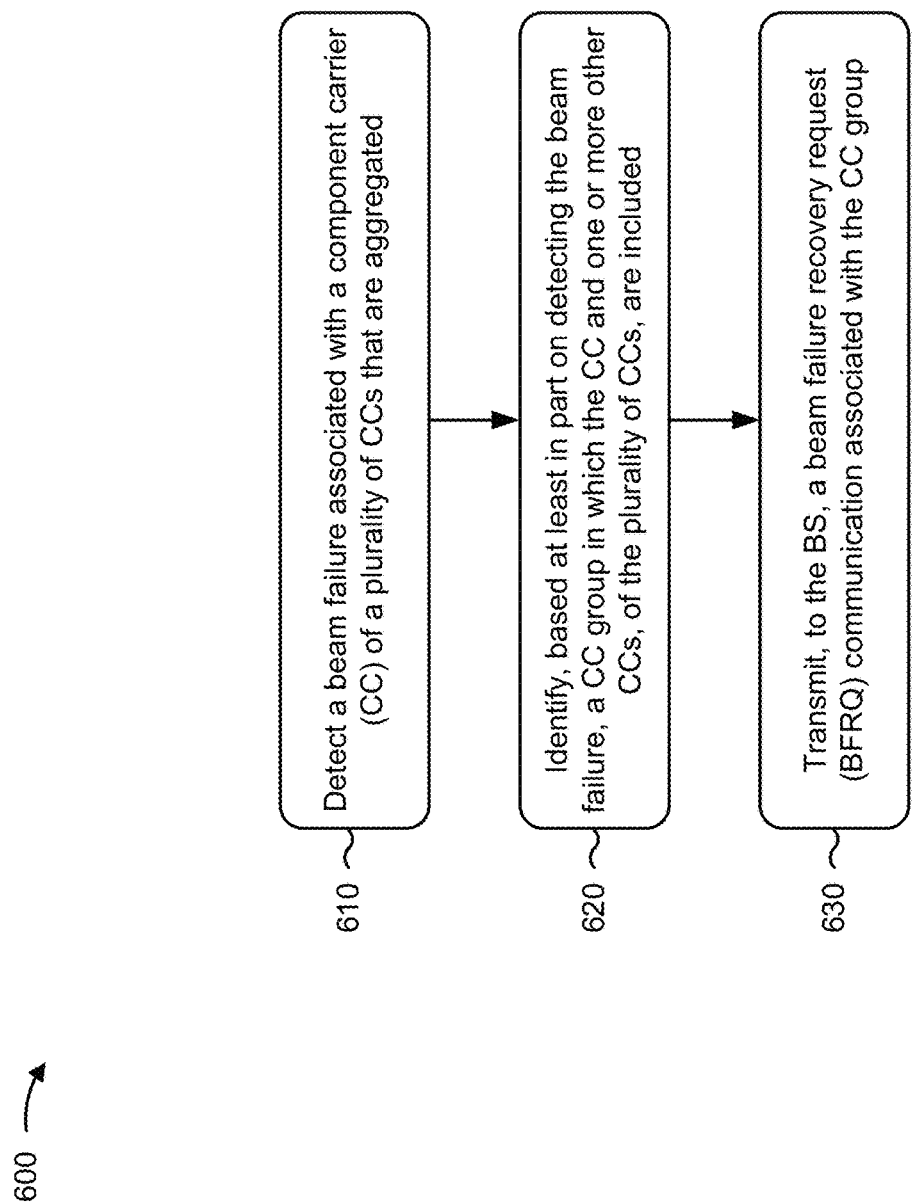
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with indicating a beam failure.

As shown in FIG. 6, in some aspects, process 600 may include detecting a beam failure associated with a CC of a plurality of CCs that are aggregated (block 610). For example, the UE (e.g., using receive processor 258, transmit processor 264, controller/processor 280, memory 282, and/or the like) may detect a beam failure associated with a CC of a plurality of CCs that are aggregated, as described above. In some aspects, the plurality of CCs are aggregated for the UE by a BS.

As further shown in FIG. 6, in some aspects, process 600 may include identifying, based at least in part on detecting the beam failure, a CC group in which the CC and one or more other CCs, of the plurality of CCs, are included (block 620). For example, the UE (e.g., using receive processor 258, transmit processor 264, controller/processor 280, memory 282, and/or the like) may identify, based at least in part on detecting the beam failure, a CC group in which the CC and one or more other CCs, of the plurality of CCs, are included, as described above.

As further shown in FIG. 6, in some aspects, process 600 may include transmitting, to the BS, a BFRQ communication associated with the CC group (block 630). For example, the UE (e.g., using receive processor 258, transmit processor 264, controller/processor 280, memory 282, and/or the like) may transmit, to the BS, a BFRQ communication associated with the CC group, as described above.

Process 600 may include additional aspects, such as any single implementation or any combination of aspects described below and/or in connection with one or more other processes described elsewhere herein.

In a first aspect, the one or more other CCs, included in the CC group, comprises a subset of CCs included in the plurality of CCs. In a second aspect, alone or in combination with the first aspect, the BFRQ communication includes an explicit indication of a CC group index associated with the CC group. In a third aspect, alone or in combination with one or more of the first or second aspects, the one or more other CCs, included in the CC group, comprises a subset of CCs included in the plurality of CCs. In a fourth aspect, alone or in combination with one or more of the first through third aspects, process 600 comprises transmitting, to the BS and using a time domain resource and a frequency domain resource that are based at least in part on the BFRQ communication, a reporting communication that includes an explicit indication of a CC group index associated with the CC group.

In a fifth aspect, alone or in combination with one or more of the first through fourth aspects, the one or more other CCs, included in the CC group, comprises a subset of CCs included in the plurality of CCs. In a sixth aspect, alone or in combination with one or more of the first through fifth aspects, the BFRQ communication includes an implicit indication of a CC group index associated with the CC group. In a seventh aspect, alone or in combination with one or more of the first through sixth aspects, the implicit indication of the CC group index comprises at least one of an indication of a CC index associated with the CC, an indication of another CC index associated with another CC included in the one or more other CCs, transmitting the BFRQ communication using a time domain resource and a frequency domain resource that are associated with the CC group index, or scrambling the BFRQ communication using a scrambling sequence associated with the CC group index.

In an eighth aspect, alone or in combination with one or more of the first through seventh aspects, the one or more other CCs, included in the CC group, comprises a subset of CCs included in the plurality of CCs. In a ninth aspect, alone or in combination with one or more of the first through eighth aspects, process 600 comprises transmitting, to the BS and based at least in part on a dynamic reporting rule an explicit indication of a CC group index associated with the CC group or an implicit indication of the CC group index. In a tenth aspect, alone or in combination with one or more of the first through ninth aspects, process 600 comprises receiving, from the BS, information identifying the dynamic reporting rule, determining to transmit the implicit indication of the CC group index based at least in part on the dynamic reporting rule indicating the time domain resource and the frequency domain resource for transmitting the BFRQ communication. In an eleventh aspect, alone or in combination with one or more of the first through tenth aspects, transmitting the implicit indication of the CC group index comprises transmitting the BFRQ communication using the time domain resource and the frequency domain resource.

In a twelfth aspect, alone or in combination with one or more of the first through eleventh aspects, the dynamic reporting rule indicates a CC group quantity threshold. In a thirteenth aspect, alone or in combination with one or more of the first through twelfth aspects, process 600 comprises determining to transmit the implicit indication of the CC group index based at least in part on determining that a quantity of CC groups, configured for the plurality of CCs, does not satisfy the CC group quantity threshold, or determining to transmit the explicit indication of the CC group index based at least in part on determining that the quantity of CC groups, configured for the plurality of CCs, satisfies the CC group quantity threshold. In a fourteenth aspect, alone or in combination with one or more of the first through thirteenth aspects, the CC and the one or more other CCs are QCLed.

In a fifteenth aspect, alone or in combination with one or more of the first through fourteenth aspects, the CC and the one or more other CCs are associated with a same BFD-RS. In a sixteenth aspect, alone or in combination with one or more of the first through fifteenth aspects, the CC and the one or more other CCs are included in a same frequency band. In a seventeenth aspect, alone or in combination with one or more of the first through sixteenth aspects, the CC group comprises the plurality of CCs aggregated to the UE by the BS. In an eighteenth aspect, alone or in combination with one or more of the first through seventeenth aspects, transmitting the BFRQ communication associated with the CC group comprises refraining from indicating a CC index or CC group index in the BFRQ communication. In a nineteenth aspect, alone or in combination with one or more of the first through eighteenth aspects, identifying the CC group comprises receiving, from the BS, an indication that the CC and the one or more other CCs are included in the CC group and identifying the CC group based at least in part on the indication that the CC and the one or more other CCs are included in the CC group. In a twentieth aspect, alone or in combination with one or more of the first through nineteenth aspects, detecting the beam failure associated with the CC comprises detecting the beam failure based at least in part on a BFD-RS transmitted from the BS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
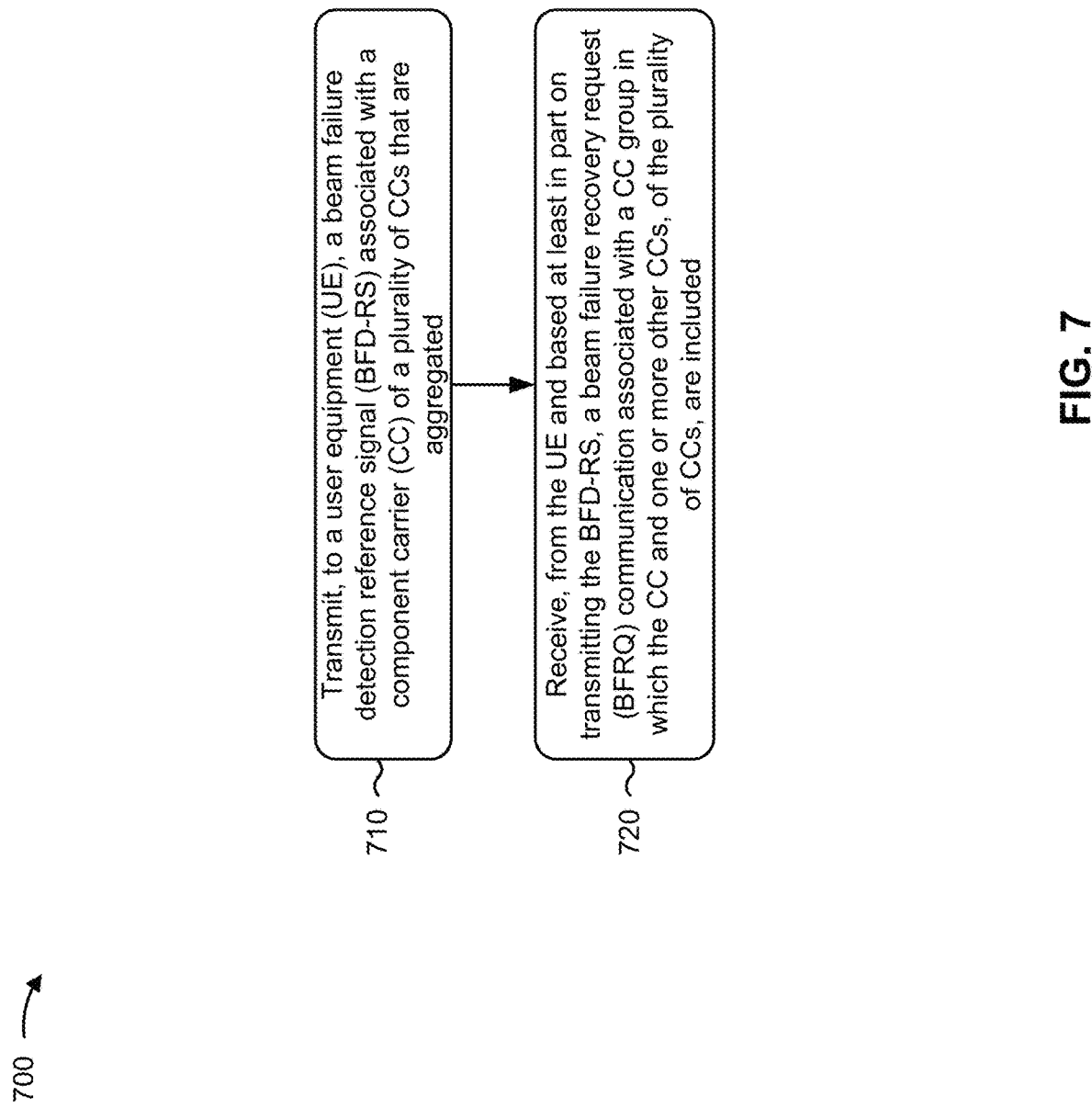
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with indicating a beam failure.

As shown in FIG. 7, in some aspects, process 700 may include transmitting, to a UE, a BFD-RS associated with a CC of a plurality of CCs aggregated (block 710). For example, the BS (e.g., using transmit processor 220, receive processor 238, controller/processor 240, memory 242, and/ or the like) may transmit, to a UE, a BFD-RS associated with a CC of a plurality of CCs aggregated, as described above. In some aspects, the plurality of CCs are aggregated for the UE by the BS.

As further shown in FIG. 7, in some aspects, process 700 may include receiving, from the UE and based at least in part on transmitting the BFD-RS, a BFRQ communication associated with a CC group in which the CC and one or more other CCs, of the plurality of CCs, are included (block 720). For example, the BS (e.g., using transmit processor 220, receive processor 238, controller/processor 240, memory 242, and/or the like) may receive, from the UE and based at least in part on transmitting the BFD-RS, a BFRQ communication associated with a CC group in which the CC and one or more other CCs, of the plurality of CCs, are included, as described above.

Process 700 may include additional aspects, such as any single implementation or any combination of aspects described below and/or in connection with one or more other processes described elsewhere herein.

In a first aspect, the one or more other CCs, included in the CC group, comprises a subset of CCs included in the plurality of CCs. In a second aspect, alone or in combination with the first aspect, the BFRQ communication includes an explicit indication of a CC group index associated with the CC group. In a third aspect, alone or in combination with one or more of the first or second aspects, the one or more other CCs, included in the CC group, comprises: a subset of CCs included in the plurality of CCs. In a fourth aspect, alone or in combination with one or more of the first through third aspects, process 700 comprises transmitting, to the UE and based at least in part on receiving the BFRQ communication, a scheduling order that indicates a time domain resource and a frequency domain resource that are for reporting an explicit indication of a CC group index associated with the CC group and receiving, from the UE and based at least in part on transmitting the scheduling order, a reporting communication that includes the explicit indication of the CC group index.

In a fifth aspect, alone or in combination with one or more of the first through fourth aspects, the one or more other CCs, included in the CC group, comprises a subset of CCs included in the plurality of CCs. In a sixth aspect, alone or in combination with one or more of the first through fifth aspects, the BFRQ communication includes an implicit indication of a CC group index associated with the CC group. In a seventh aspect, alone or in combination with one or more of the first through sixth aspects, the implicit indication of the CC group index comprises at least one of an indication of a CC index associated with the CC or an indication of another CC index associated with another CC included in the one or more other CCs. In an eighth aspect, alone or in combination with one or more of the first through seventh aspects, the one or more other CCs, included in the CC group, comprises a subset of CCs included in the plurality of CCs. In a ninth aspect, alone or in combination with one or more of the first through eighth aspects, process 700 comprises receiving, from the UE and based at least in part on a dynamic reporting rule, an explicit indication of a CC group index associated with the CC group or an implicit indication of the CC group index.

In a tenth aspect, alone or in combination with one or more of the first through ninth aspects, process 700 comprises transmitting, to the UE, information identifying the dynamic reporting rule. In an eleventh aspect, alone or in combination with one or more of the first through tenth aspects, the information identifying the dynamic reporting rule indicates a time domain resource and a frequency domain resource for transmitting the BFRQ communication. In a twelfth aspect, alone or in combination with one or more of the first through eleventh aspects, receiving the implicit indication of the CC group index comprises receiving the BFRQ communication in the time domain resource and the frequency domain resource. In a thirteenth aspect, alone or in combination with one or more of the first through twelfth aspects, the dynamic reporting rule indicates a CC group quantity threshold. In a fourteenth aspect, alone or in combination with one or more of the first through thirteenth aspects, receiving the implicit indication of the CC group index comprises receiving the implicit indication of the CC group index based at least in part on a quantity of CC groups, configured for the plurality of CCs, not satisfying the CC group quantity threshold.

In a fifteenth aspect, alone or in combination with one or more of the first through fourteenth aspects, the dynamic reporting rule indicates a CC group quantity threshold. In a sixteenth aspect, alone or in combination with one or more of the first through fifteenth aspects, receiving the explicit indication of the CC group index comprises receiving the explicit indication of the CC group index based at least in part on a quantity of CC groups, configured for the plurality of CCs, satisfying the CC group quantity threshold. In a seventeenth aspect, alone or in combination with one or more of the first through sixteenth aspects, the CC and the one or more other CCs are QCLed. In an eighteenth aspect, alone or in combination with one or more of the first through seventeenth aspects, the CC and the one or more other CCs are associated with the BFD-RS. In a nineteenth aspect, alone or in combination with one or more of the first through eighteenth aspects, the CC and the one or more other CCs are included in a same frequency band.

In a twentieth aspect, alone or in combination with one or more of the first through nineteenth aspects, the CC group includes the plurality of CCs. In a twenty-first aspect, alone or in combination with one or more of the first through twentieth aspects, the BFRQ communication associated with the CC group does not include an indication of a CC index or CC group index. In a twenty-second aspect, alone or in combination with one or more of the first through twenty-first aspects, process 700 comprises determining that the BFRQ communication is associated with the CC group based at least in part on the CC group including the plurality of CCs. In a twenty-third aspect, alone or in combination with one or more of the first through twenty-second aspects, process 700 comprises receiving one or more measurement reports associated with the CC and the one or more other CCs, grouping, based at least in part on the one or more measurement reports, the CC and the one or more other CCs into the CC group, and transmitting, to the UE, an indication that the CC group includes the CC and the one or more other CCs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting a beam failure associated with a component carrier (CC) of a plurality of CCs that are aggregated;
   identifying, based at least in part on detecting the beam failure, a CC group in which the CC and one or more other CCs, of the plurality of CCs, are included; and
   transmitting, to a base station (BS), a beam failure recovery request (BFRQ) communication associated with the CC group.

2. The method of claim 1, wherein the one or more other CCs, included in the CC group, comprises:
   a subset of CCs included in the plurality of CCs; and
   wherein the BFRQ communication includes an explicit or implicit indication of a CC group index associated with the CC group.

3. The method of claim 2, wherein the implicit indication of the CC group index comprises at least one of:
   an indication of a CC index associated with the CC,
   an indication of another CC index associated with another CC included in the one or more other CCs,
   transmitting the BFRQ communication using a time domain resource and a frequency domain resource that are associated with the CC group index, or
   scrambling the BFRQ communication using a scrambling sequence associated with the CC group index.

4. The method of claim 1, further comprising:
   transmitting, to the BS and using a time domain resource and a frequency domain resource that are based at least in part on the BFRQ communication, a reporting communication that includes an explicit indication of a CC group index associated with the CC group.

5. The method of claim 1, further comprising:
   transmitting, to the BS and based at least in part on a dynamic reporting rule:
   an explicit indication of a CC group index associated with the CC group, or
   an implicit indication of the CC group index.

6. The method of claim 5, further comprising:
   receiving, from the BS, information identifying the dynamic reporting rule,
   wherein the information identifying the dynamic reporting rule indicates a time domain resource and a frequency domain resource for transmitting the BFRQ communication; and
   determining to transmit the implicit indication of the CC group index based at least in part on the dynamic reporting rule indicating the time domain resource and the frequency domain resource for transmitting the BFRQ communication; and wherein transmitting the implicit indication of the CC group index comprises:
    transmitting the BFRQ communication using the time domain resource and the frequency domain resource.

7. The method of claim 5, wherein the dynamic reporting rule indicates a CC group quantity threshold; and
wherein the method further comprises:
    determining to transmit the implicit indication of the CC group index based at least in part on determining that a quantity of CC groups, configured for the plurality of CCs, does not satisfy the CC group quantity threshold, or
    determining to transmit the explicit indication of the CC group index based at least in part on determining that the quantity of CC groups, configured for the plurality of CCs, satisfies the CC group quantity threshold.

8. The method of claim 1, wherein the CC and the one or more other CCs are quasi-co-located (QCLed).

9. The method of claim 1, wherein the CC and the one or more other CCs are associated with a same beam failure detection reference signal (BFD-RS).

10. The method of claim 1, wherein the CC and the one or more other CCs are included in a same frequency band.

11. The method of claim 1, wherein the CC group comprises:
    the plurality of CCs aggregated to the UE by the BS; and
    wherein transmitting the BFRQ communication associated with the CC group comprises:
        refraining from indicating a CC index or CC group index in the BFRQ communication.

12. The method of claim 1, wherein identifying the CC group comprises:
    receiving, from the BS, an indication that the CC and the one or more other CCs are included in the CC group; and
    identifying the CC group based at least in part on the indication that the CC and the one or more other CCs are included in the CC group.

13. The method of claim 1, wherein detecting the beam failure associated with the CC comprises:
    detecting the beam failure based at least in part on a beam failure detection reference signal (BFD-RS) transmitted from the BS.

14. A method of wireless communication performed by a base station (BS), comprising:
    transmitting, to a user equipment (UE), a beam failure detection reference signal (BFD-RS) associated with a component carrier (CC) of a plurality of CCs that are aggregated; and
    receiving, from the UE and based at least in part on transmitting the BFD-RS, a beam failure recovery request (BFRQ) communication associated with a CC group in which the CC and one or more other CCs, of the plurality of CCs, are included.

15. The method of claim 14, wherein the one or more other CCs, included in the CC group, comprises:
    a subset of CCs included in the plurality of CCs; and
    wherein the BFRQ communication includes an explicit or implicit indication of a CC group index associated with the CC group.

16. The method of claim 15, wherein the implicit indication of the CC group index comprises at least one of:
    an indication of a CC index associated with the CC, or
    an indication of another CC index associated with another CC included in the one or more other CCs.

17. The method of claim 14, further comprising:
    transmitting, to the UE and based at least in part on receiving the BFRQ communication, a scheduling order that indicates a time domain resource and a frequency domain resource that are for reporting an explicit indication of a CC group index associated with the CC group; and
    receiving, from the UE and based at least in part on transmitting the scheduling order, a reporting communication that includes the explicit indication of the CC group index.

18. The method of claim 14, wherein the BFRQ communication includes an implicit indication of a CC group index associated with the CC group.

19. The method of claim 14, further comprising:
    receiving, from the UE and based at least in part on a dynamic reporting rule:
        an explicit indication of a CC group index associated with the CC group, or
        an implicit indication of the CC group index.

20. The method of claim 19, further comprising:
    transmitting, to the UE, information identifying the dynamic reporting rule,
        wherein the information identifying the dynamic reporting rule indicates a time domain resource and a frequency domain resource for transmitting the BFRQ communication; and
    wherein receiving the implicit indication of the CC group index comprises:
        receiving the BFRQ communication in the time domain resource and the frequency domain resource.

21. The method of claim 20, wherein the dynamic reporting rule indicates a CC group quantity threshold; and
    wherein receiving the implicit indication of the CC group index comprises:
        receiving the implicit indication of the CC group index based at least in part on a quantity of CC groups, configured for the plurality of CCs, not satisfying the CC group quantity threshold.

22. The method of claim 20, wherein the dynamic reporting rule indicates a CC group quantity threshold; and
    wherein receiving the explicit indication of the CC group index comprises:
        receiving the explicit indication of the CC group index based at least in part on a quantity of CC groups, configured for the plurality of CCs, satisfying the CC group quantity threshold.

23. The method of claim 14, wherein the CC and the one or more other CCs are quasi-co-located (QCLed).

24. The method of claim 14, wherein the CC and the one or more other CCs are associated with the BFD-RS.

25. The method of claim 14, wherein the CC and the one or more other CCs are included in a same frequency band.

26. The method of claim 14, wherein the CC group includes the plurality of CCs;
    wherein the BFRQ communication associated with the CC group does not include an indication of a CC index or CC group index; and
    wherein the method further comprises:
        determining that the BFRQ communication is associated with the CC group based at least in part on the CC group including the plurality of CCs.

27. The method of claim 14, further comprising:
    receiving one or more measurement reports associated with the CC and the one or more other CCs;
    grouping, based at least in part on the one or more measurement reports, the CC and the one or more other CCs into the CC group; and transmitting, to the UE, an indication that the CC group includes the CC and the one or more other CCs.

28. A user equipment (UE), comprising:
a memory; and
one or more processors communicatively coupled to the memory, the one or more processors configured to:
   detect a beam failure associated with a component carrier (CC) of a plurality of CCs that are aggregated;
   identify, based at least in part on detecting the beam failure, a CC group in which the CC and one or more other CCs, of the plurality of CCs, are included; and
   transmit, to a base station (BS), a beam failure recovery request (BFRQ) communication associated with the CC group.

29. The UE of claim 28, wherein the BFRQ communication includes an explicit or implicit indication of a CC group index associated with the CC group.

30. UE of claim 29, wherein the implicit indication of the CC group index comprises at least one of:
   an indication of a CC index associated with the CC,
   an indication of another CC index associated with another CC included in the one or more other CCs,
   transmitting the BFRQ communication using a time domain resource and a frequency domain resource that are associated with the CC group index, or
   scrambling the BFRQ communication using a scrambling sequence associated with the CC group index.

31. The UE of claim 28, wherein the one or more processors are further configured to:
   transmit, to the BS and using a time domain resource and a frequency domain resource that are based at least in part on the BFRQ communication, a reporting communication that includes an explicit indication of a CC group index associated with the CC group.

32. The UE of claim 28, wherein the one or more processors are further configured to:
   transmit, to the BS and based at least in part on a dynamic reporting rule:
      an explicit indication of a CC group index associated with the CC group, or
      an implicit indication of the CC group index.

33. The UE of claim 28, wherein the one or more processors are further configured to:
   receive, from the BS, information identifying a dynamic reporting rule,
      wherein the information identifying the dynamic reporting rule indicates a time domain resource and a frequency domain resource for transmitting the BFRQ communication; and
   determine to transmit an implicit indication of a CC group index based at least in part on the dynamic reporting rule indicating the time domain resource and the frequency domain resource for transmitting the BFRQ communication; and
   wherein the one or more processors, when transmitting the implicit indication of the CC group index, are configured to:
      transmit the BFRQ communication using the time domain resource and the frequency domain resource.

34. The UE of claim 33, wherein the dynamic reporting rule indicates a CC group quantity threshold; and
   wherein the one or more processors are further configured to:
      determine to transmit the implicit indication of the CC group index based at least in part on determining that a quantity of CC groups, configured for the plurality of CCs, does not satisfy the CC group quantity threshold, or
      determine to transmit the explicit indication of the CC group index based at least in part on determining that the quantity of CC groups, configured for the plurality of CCs, satisfies the CC group quantity threshold.

35. The UE of claim 28, wherein the CC and the one or more other CCs are quasi-co-located (QCLed).

36. The UE of claim 28, wherein the CC and the one or more other CCs are associated with a same beam failure detection reference signal (BFD-RS).

37. The UE of claim 28, wherein the CC and the one or more other CCs are included in a same frequency band.

38. The UE of claim 28, wherein the CC group comprises:
   the plurality of CCs aggregated to the UE by the BS; and
   wherein the one or more processors, when transmitting the BFRQ communication associated with the CC group, are configured to:
      refrain from indicating a CC index or CC group index in the BFRQ communication.

39. The UE of claim 28, wherein the one or more processors, when identifying the CC group, are configured to:
   receive, from the BS, an indication that the CC and the one or more other CCs are included in the CC group; and
   identify the CC group based at least in part on the indication that the CC and the one or more other CCs are included in the CC group.

40. The UE of claim 28, wherein the one or more processors, when detecting the beam failure associated with the CC, are configured to:
   detect the beam failure based at least in part on a beam failure detection reference signal (BFD-RS) transmitted from the BS.

41. A base station (BS), comprising:
a memory; and
one or more processors communicatively coupled to the memory, the one or more processors configured to:
   transmit, to a user equipment (UE), a beam failure detection reference signal (BFD-RS) associated with a component carrier (CC) of a plurality of CCs that are aggregated; and
   receive, from the UE and based at least in part on transmitting the BFD-RS, a beam failure recovery request (BFRQ) communication associated with a CC group in which the CC and one or more other CCs, of the plurality of CCs, are included.

42. The BS of claim 41, wherein the BFRQ communication includes an explicit or implicit indication of a CC group index associated with the CC group.

43. The BS of claim 42, wherein the implicit indication of the CC group index comprises at least one of:
   an indication of a CC index associated with the CC, or
   an indication of another CC index associated with another CC included in the one or more other CCs.

44. The BS of claim 41, wherein the one or more processors are further configured to:
   transmit, to the UE and based at least in part on receiving the BFRQ communication, a scheduling order that indicates a time domain resource and a frequency domain resource that are for reporting an explicit indication of a CC group index associated with the CC group; and receive, from the UE and based at least in part on transmitting the scheduling order, a reporting communication that includes the explicit indication of the CC group index.

45. The BS of claim 41, wherein the one or more processors are further configured to:
receive, from the UE and based at least in part on a dynamic reporting rule:
an explicit indication of a CC group index associated with the CC group, or
an implicit indication of the CC group index.

46. The BS of claim 45, wherein the one or more processors are further configured to:
transmit, to the UE, information identifying the dynamic reporting rule,
wherein the information identifying the dynamic reporting rule indicates a time domain resource and a frequency domain resource for transmitting the BFRQ communication; and
wherein the one or more processors, when receiving the implicit indication of the CC group index, are configured to:
receive the BFRQ communication in the time domain resource and the frequency domain resource.

47. The BS of claim 45, wherein the dynamic reporting rule indicates a CC group quantity threshold; and
wherein the one or more processors, when receiving the implicit indication of the CC group index, are configured to:
receive the implicit indication of the CC group index based at least in part on a quantity of CC groups, configured for the plurality of CCs, not satisfying the CC group quantity threshold.

48. The BS of claim 45, wherein the dynamic reporting rule indicates a CC group quantity threshold; and
wherein the one or more processors, when receiving the explicit indication of the CC group index, are configured to:
receive the explicit indication of the CC group index based at least in part on a quantity of CC groups, configured for the plurality of CCs, satisfying the CC group quantity threshold.

49. The BS of claim 41, wherein the CC and the one or more other CCs are quasi-co-located (QCLed).

50. The BS of claim 41, wherein the CC and the one or more other CCs are associated with the BFD-RS.

51. The BS of claim 41, wherein the CC and the one or more other CCs are included in a same frequency band.

52. The BS of claim 41, wherein the CC group includes the plurality of CCs;
wherein the BFRQ communication associated with the CC group does not include an indication of a CC index or CC group index; and
wherein the one or more processors are further configured to:
determine that the BFRQ communication is associated with the CC group based at least in part on the CC group including the plurality of CCs.

53. The BS of claim 41, wherein the one or more processors are further configured to:
receive one or more measurement reports associated with the CC and the one or more other CCs;
group, based at least in part on the one or more measurement reports, the CC and the one or more other CCs into the CC group; and
transmit, to the UE, an indication that the CC group includes the CC and the one or more other CCs.

* * * * *